(12) United States Patent
Carvill et al.

(10) Patent No.: US 7,959,976 B2
(45) Date of Patent: Jun. 14, 2011

(54) COATED FILM AND METHOD OF MAKING THE SAME

(75) Inventors: Brian Carvill, Evansville, IN (US); Robert Grahn, Wadesville, IN (US); Ta-Hua Yu, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 1723 days.

(21) Appl. No.: 10/958,943

(22) Filed: Oct. 5, 2004

(65) Prior Publication Data

US 2006/0073339 A1   Apr. 6, 2006

(51) Int. Cl.
*B05D 3/00* (2006.01)
*B29C 43/24* (2006.01)

(52) U.S. Cl. ......... 427/302; 427/299; 264/175; 264/211

(58) Field of Classification Search .............. 428/411.1, 428/412; 264/1.3, 171.1, 174, 211; 427/299, 427/302
See application file for complete search history.

(56) References Cited

U.S. PATENT DOCUMENTS

| | | | |
|---|---|---|---|
| 3,681,483 A | 8/1972 | Moore | 264/1 |
| 3,937,863 A | 2/1976 | Moore | 428/410 |
| 4,011,976 A | 3/1977 | Greer | 226/8 |
| 4,247,507 A | 1/1981 | Katoh et al. | 264/210.2 |
| 4,351,920 A | 9/1982 | Ariga et al. | 525/67 |
| 5,271,968 A | 12/1993 | Coyle et al. | 427/558 |
| 5,281,371 A | 1/1994 | Tamura et al. | |
| 5,455,105 A | 10/1995 | Coyle et al. | 428/215 |
| 5,468,542 A | 11/1995 | Crouch | 428/215 |
| 5,990,984 A | 11/1999 | Meredith, Jr. et al. | 348/834 |
| 6,250,904 B1 | 6/2001 | Reddy et al. | 425/135 |
| 2002/0114922 A1 | 8/2002 | Bourne et al. | 428/141 |
| 2002/0114923 A1 | 8/2002 | Lilly | |
| 2003/0108710 A1 | 6/2003 | Coyle et al. | 428/64.4 |

FOREIGN PATENT DOCUMENTS

| | | |
|---|---|---|
| GB | 2039244 | 8/1980 |
| WO | WO 0152252 A1 | 7/2001 |

OTHER PUBLICATIONS

International Search Report; International Application No. PCT/US2005/035502, Applicant's Reference No. 08CS154005, International Filing Date Apr. 10, 2005, Date of Mailing Jan. 31, 2006.

*Primary Examiner* — James Seidleck
*Assistant Examiner* — Saira Haider
(74) *Attorney, Agent, or Firm* — Cantor Colburn LLP

(57) ABSTRACT

A method of making a coated film comprises coating a first side of a base film with a coating material to form the coated film; wherein the base film was formed in a calendaring process, and wherein, during the calendaring process, the first side physically contacted less surface area of a first roll than a second side physically contacted of a second roll at a given time; and wherein the coated film has an uncoated second side.

15 Claims, 3 Drawing Sheets

US 7,959,976 B2

COATED FILM AND METHOD OF MAKING THE SAME

BACKGROUND

In a method of making a thermoplastic film (which can also be referred to as a sheet, layer, foil, and the like), an extrusion system can be employed, wherein a thermoplastic plastic resin can be extruded through a screw extruder to form the thermoplastic film. The extruded thermoplastic film can be pulled by a pull roll and drawn under pressure between a first nip roll and a second nip roll, which can be independently driven by separate motors (e.g., driven by direct current (DC) electric motors). It is noted that roll speed fluctuations between the rolls can cause "ripples" to appear on the extruded thermoplastic film. Other factors that can cause ripples in the film include differences in the nip force between the rolls, differences in the film flow rates at the nip rolls and the pull roll, differences in roll speeds, and the like.

One application where ripples can be problematic is in an application where the thermoplastic film is used as an optical film (e.g., in compact disks (CDs), digital video disks (DVDs), light-management films for liquid crystal display (LCD) devices, eye glasses, windows panes, and the like). More particularly, ripples in the thermoplastic film can cause undesirable optical properties in the film (e.g., a decrease in luminance (e.g., brightness) and an increase in the percentage of haze), which can be tiring on the eyes of a viewer.

Accordingly, what is needed in the art is a method of making a thermoplastic film that minimizes and/or eliminates the appearance of ripples in the thermoplastic film.

SUMMARY

Disclosed herein is a method of making a coated film and the coated film.

One embodiment of a method of making a coated film comprises coating a first side of a base film with a coating material to form the coated film; wherein the base film was formed in a calendaring process, and wherein, during the calendaring process, the first side physically contacted less surface area of a first roll than a second side physically contacted of a second roll at a given time; and wherein the coated film has an uncoated second side.

Another embodiment of a method of making a coated film comprises coating a first side of a base film with a coating material to form the coated film; wherein the base film was formed in a calendaring process, and wherein, during the calendaring process: a resin was extruded onto a first roll and a second roll; the resin passed between the first roll and the second roll to form the base film; wherein the first roll had a lesser surface area in physical contact with the resin than the second roll at a given time; and wherein the first side physically contacted the first roll; and wherein the coated film has and uncoated second side.

One embodiment of a coated film comprises a base film having a first side coated with a coating material and an uncoated second side; wherein the base film was formed in a calendaring process, and wherein, during the calendaring process, the first side physically contacted less surface area of a first roll than a second side physically contacted of a second roll at a given time.

Another a coated film comprises a base film having a first side coated with a coating material and an uncoated second side; wherein the base film was formed in a calendaring process, and wherein, during the calendaring process: a resin was extruded onto a first roll and a second roll; the resin passed between the first roll and the second roll to form the base film; wherein the first roll had a lesser surface area in physical contact with the resin than the second roll at a given time; and wherein the first side contacted the first roll.

The above-described and other features will be appreciated and understood by those skilled in the art from the following detailed description, drawings, and appended claims.

BRIEF DESCRIPTION OF THE DRAWINGS

Referring now to the figures, which are exemplary embodiments, and wherein the like elements are numbered alike.

DETAILED DESCRIPTION

It should first be noted that the terms "first," "second," and the like herein do not denote any order, quantity, or importance, but rather are used to distinguish one element from another, and the terms "a" and "an" herein do not denote a limitation of quantity, but rather denote the presence of at least one of the referenced item. Furthermore, all ranges disclosed herein are inclusive and combinable (e.g., ranges of "up to about 25 weight percent (wt. %), with about 5 wt. % to about 20 wt. % desired, and about 10 wt. % to about 15 wt. % more desired," is inclusive of the endpoints and all intermediate values of the ranges, e.g., "about 5 wt. % to about 25 wt. %, about 5 wt. % to about 15 wt. %," etc.).

It has been discovered that coating a base film with a coating material can reduce the appearance of ripples in a film. More particularly, as will be explained in greater detail below, it has been discovered that a significant reduction in ripples can be observed when the base film is coated on a first side of the base film, wherein the first side of the base film is the side of the base film physically contacting a first roll. More particularly, the first roll is the roll that has the least amount of surface area in physical contact with the base film at a given time, as compared to a second roll that is in physical contact with a second surface of the base film. The first side and second side of the base film, the first roll and second roll, and the like will become increasingly clear by reference to the exemplary embodiments illustrated in the figures.

Figure 1:
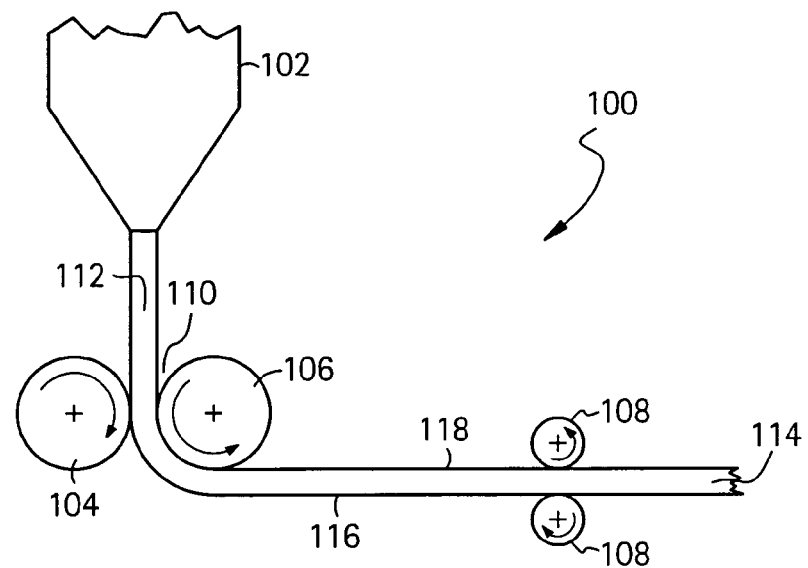
FIG. 1 is a schematic illustration of an embodiment of an extrusion system for producing a base film used in producing a coated film.
Figure 2:
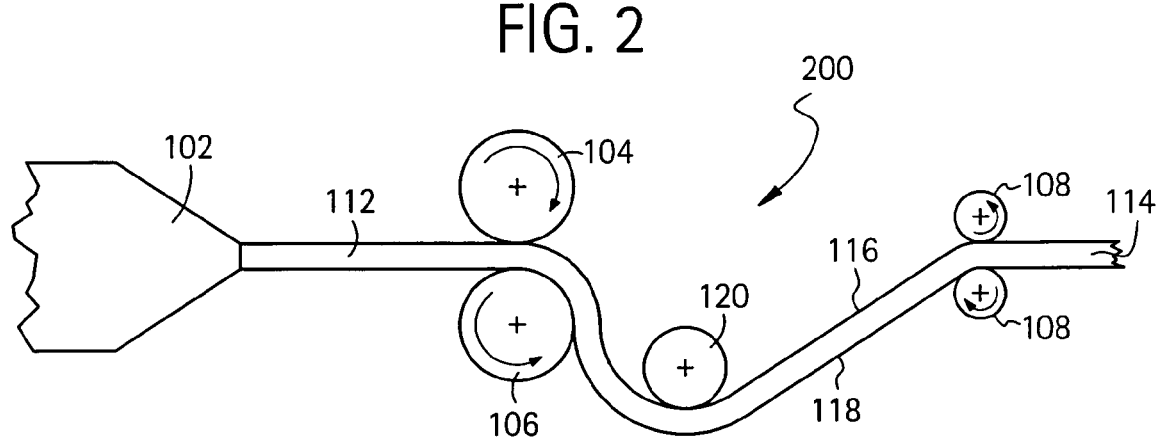
FIG. 2 is a schematic illustration of another embodiment of an extrusion system for producing a base film used in producing a coated film.

Referring to FIG. 1, a schematic view of an exemplary extrusion system, generally designated 100, is illustrated. The system comprises a slot die 102, a first calendering roll 104, a second calendering roll 106, and pull rolls 108. A nip 110 (or gap) is formed between the first calendering roll 104 and the second calendering roll 106. In this illustration, the slot die 102 is perpendicular to the first and second calendering rolls (104, 106). However, it is to be understood that other embodiments are envisioned where the slot die 102 is parallel to the first and second calendering rolls (104, 106) (e.g., system 200 illustrated in FIG. 2) and where the slot die 102 is disposed at an angle relative to the first and second calendering roll (104, 106) (not shown). Additionally, the system can further comprise additional rolls (e.g., roll 120 in FIG. 2).

In operation, molten thermoplastic resin 112 (e.g., a thermoplastic resin that has been heated to a temperature greater than a glass transition temperature ($T_g$) of the resin) is extruded from slot die 102. The molten thermoplastic resin 112 is then passed through the nip 110, which when cooled forms base film 114. It is noted that the film wraps around the second calendaring roll 106 more than the first calendaring roll 104 at a given time. In other words, the first calendering roll 104 has less surface area in physical contact with the film at a given time than the second calendering roll 106. Furthermore, a first surface 116 of the base film 114 is the surface that physically contacts the first roll 104 and a second surface 118 of the base film 114 is the surface that physically contacts the second calendering roll 106.

Having passed the molten thermoplastic resin through the nip 110, the thermoplastic resin is cooled (e.g., to a temperature less than the $T_g$ of the resin), and is then passed through pull rolls 108. The cooled film (base film 114) can then be rolled (stored) to be subsequently processed (e.g., coated), or the base film 114 can be feed directly to a coating station (device) to form the coated film.

With regards to the first and second calendering rolls (104, 106), it is further noted that the type of calendering rolls can vary depending on the desired end application of the base film 114. More particularly, the calendering rolls can comprise a roll surface texture corresponding to the desired surface texture(s) on the base film (e.g., a polish surface, a matte surface, and the like). Moreover, it is noted the first calendering roll 104 can comprise a roll surface texture that is the same as or different than that of the second calendering roll 106 such that the first surface 116 can comprise a surface texture that is the same as or different than that of the second surface 118.

In various embodiments, the calendering roll(s) (104, 106) can comprise a polished roll (e.g., a chrome or chromium plated roll). In other embodiments, the roll(s) can comprise a textured roll (e.g., a roll comprising an elastomeric material (e.g., an EPDM (ethylene propylene diamine monomer) based rubber)). It is noted that in various embodiments the roll can be made entirely of the elastomeric material. Alternatively, the elastomeric material can be disposed on an outer surface of the roll, i.e., the surface of the roll that is in physical communication with the base film. Suitable materials for the rolls include plastic, metal (e.g., chrome, stainless steel, aluminum, and the like), rubber (e.g., EPDM), ceramic materials, and the like.

Furthermore, it is generally noted that the size of the rolls, material of the rolls, number of rolls, the film wrap around the rolls, and the like can vary with the system employed. Further, it is noted that processing conditions (e.g., the temperature of the calendering rolls, the line speed, nip pressure, and the like) can also be controlled and varied based upon the desired end use of the base film 114.

Suitable thermoplastic resins for base film 114 include those capable of being extruded into the form of a film. Some possible thermoplastic resins include, but are not limited to, aromatic polycarbonates, polyetherimides, polyesters, polyphenylene ethers, polyphenylene ether/styrene polymer blends, polyamides, polyketones, acrylonitrile-butadiene-styrenes, and combinations comprising at least one of the foregoing. In one embodiment, the base film is formed from a thermoplastic polycarbonate resin, such as Lexan® resin, commercially available from General Electric Company, Schenectady, N.Y.

As briefly mentioned above, the base film (e.g., 114) is further processed to form a coated film. More particularly, a coating material is applied to the first side (e.g., 116) of the base film by any suitable method(s) to form the coated base film. For example, suitable methods of disposing the coating material on the base film include, but are not limited to, spraying, brushing, electro-deposition, dipping, flow coating, roll coating, gravure, and screen printing. Exemplary methods of coating a base film are disclosed in U.S. Pat. No. 5,455,105 to Coyle et al. and U.S. Pat. No. 5,271,968 to Coyle et al., which are herein incorporated by reference in their entirety.

Figure 3:
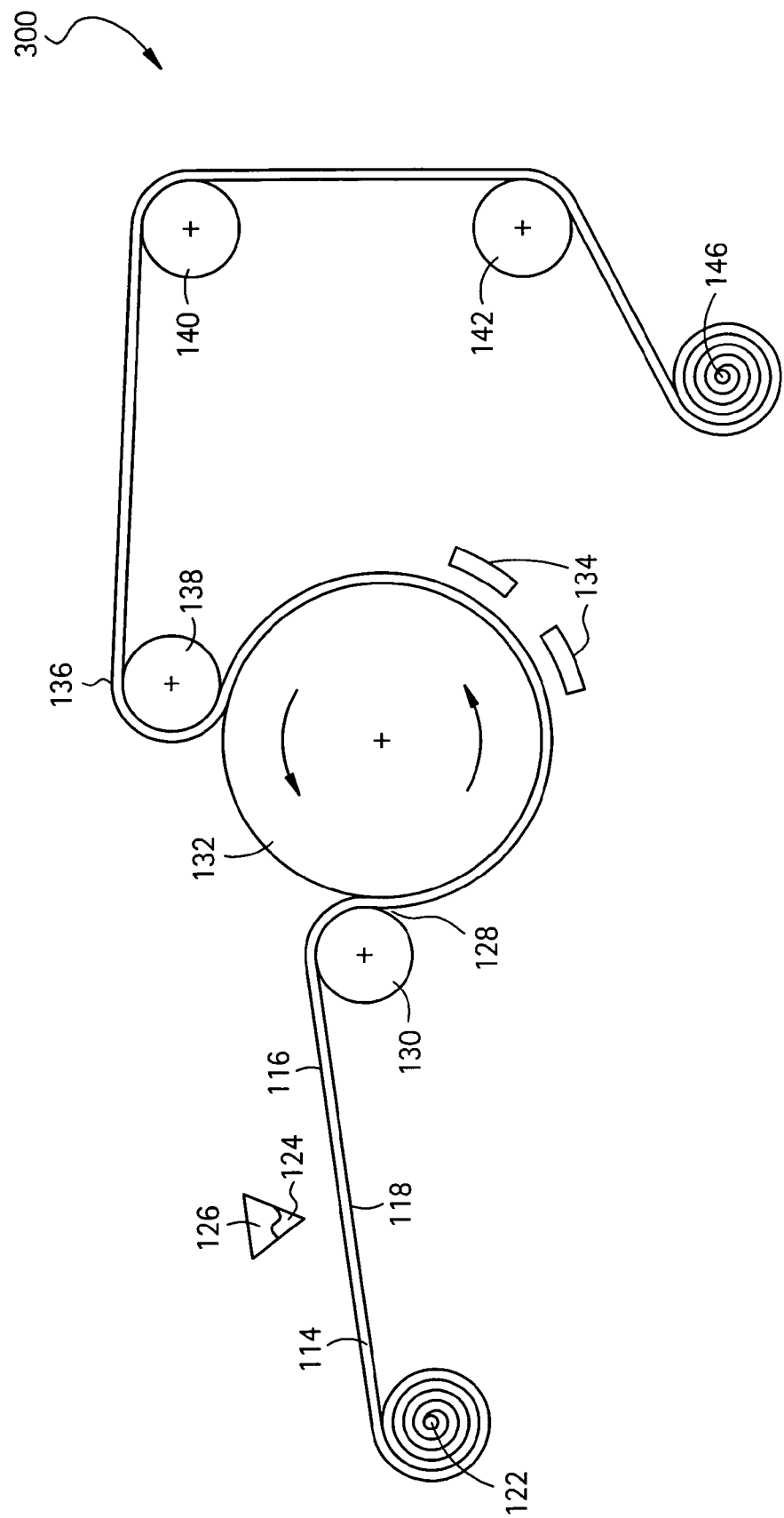
FIG. 3 is a schematic illustration of an embodiment of a system for coating a base film for producing a coated film.
Figure 4:
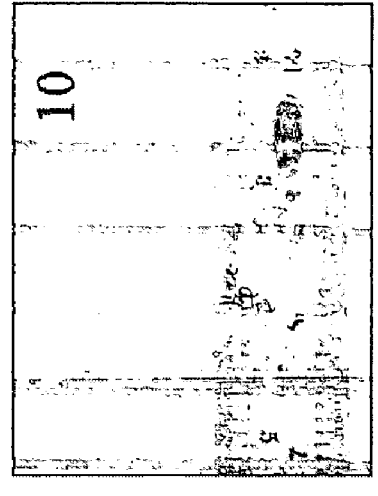
FIG. 4 is a photographic illustration of a ripple rating of 5.
Figure 5:
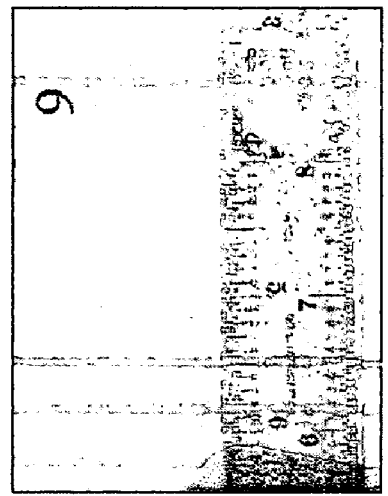
FIG. 5 is a photographic illustration of a ripple rating of 6.
Figure 6:
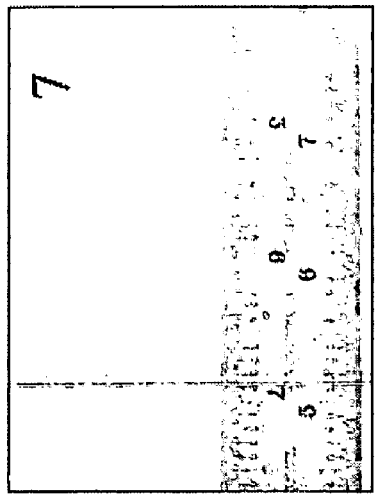
FIG. 6 is a photographic illustration of a ripple rating of 7.
Figure 7:
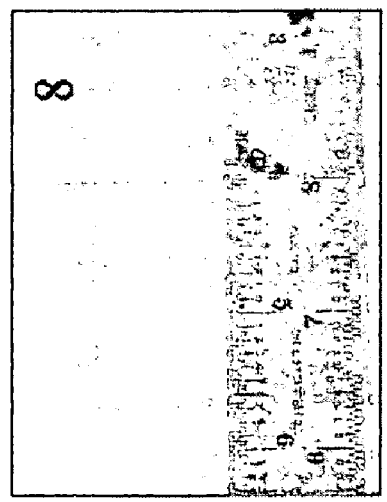
FIG. 7 is a photographic illustration of a ripple rating of 8.
Figure 8:
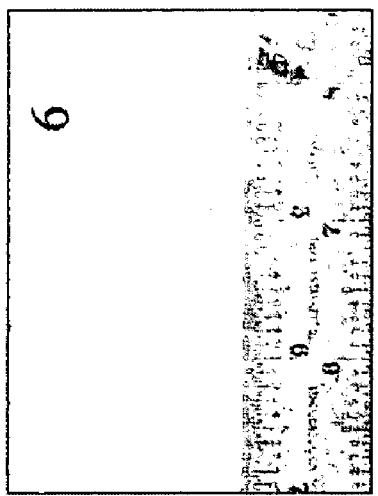
FIG. 8 is a photographic illustration of a ripple rating of 9.
Figure 9:
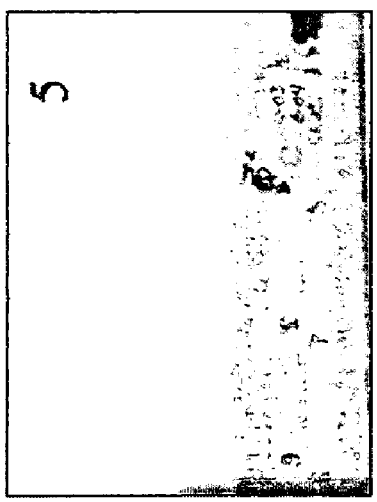
FIG. 9 is a photographic illustration of a ripple rating of 10.

Referring to FIG. 3, an exemplary system for applying a coating material to a base film, generally designated 300, is illustrated. More particularly, a base film 114 can be unwounded from a base film roll 122 such that a coating material 124 can be applied to the first surface 116 of the base film 114 by dripping the coating material 124 onto the first surface 116 by use of an applicator 126 (e.g., diaphragm pump, and the like). The base film 114 with the applied coating material 124 can be passed through a nip 128, which is formed between roll 130 and casting drum 132. It is briefly noted that in various embodiments the pressure applied to the base film with coating material 124 at nip 128 can be adjusted to minimize the presence of air (oxygen) in the coating material prior to curing of the coating material 124. After the coating material 124 has been applied to and cured on base film 114 (as discussed in greater detail below), the resulting coated film 136 can optionally be guided around idler rolls 138, 140, and 142, and then collected on a take-up roll 146.

Additionally, it is further noted with regards to the casting drum 132, that the casting drum 132 can comprise a surface texture corresponding to the desired surface texture of the coated side of the end product (e.g., the coated film). For example, the casting drum 132 can comprise a surface texture as described above in relation to first calendering roll 104 and second calendering roll 106 (e.g., a polished surface, a matte surface, and the like). Moreover, in other embodiments, the casting drum 132 can comprise various microstructures, which can be replicated into the coating material 124 to form a coated article comprising a microstructure. It is briefly noted that such microstructures can comprise a spiral pattern (e.g., suitable for DVDs), pits and groves (e.g., suitable for CDs), light-directing structures (e.g., prismatic (pyramid-like) cube corners, spheres, edges, and the like, which are suitable for light-management films (brightness enhancement films for backlight display devices)), and the like.

In various embodiments, system 300 can further comprise an ultraviolet (UV) radiation energy source 134, which can be particularly useful in embodiments where the coating material 124 comprises an UV curable material. For example, an UV radiation energy source 134 can be employed to transmit UV radiant energy to the base film 114 having the coating material 124 disposed thereon to cure the coating material 124 to form a coated film 136. More particularly, UV radiant energy can be transmitted through the second side 118 of the base film 114 to the first side 116 of base film 114 such that the coating material 124 absorbs the UV energy. In other words, the UV radiation comprises a wavelength suitable for curing the coating material 124. For example, the UV radiation can comprise a wavelength of about 2,900 Angstroms to about 4,050 Angstroms. Suitable radiation energy sources 134 include discharge lamps (e.g., xenon, metallic halide, metallic arc, and the like).

Coating material 124 can comprise a coating material capable of reducing/eliminating the appearance of ripples when coated on the base film 114. For example, the coating material 124 can comprise a curable composition, which generally comprises a polymerizable compound. Polymerizable compounds, as used herein, are monomers or oligomers comprising one or more functional groups capable of undergoing radical, cationic, anionic, thermal, and/or photochemical polymerization. Suitable functional groups include, for example, acrylate, methacrylate, vinyl, epoxide, and the like. For example, the curable composition can include monomeric and dimeric acrylates, for example, cyclopentyl methacrylate, cyclohexyl methacrylate, methylcyclohexylmethacrylate, trimethylcyclohexyl methacrylate, norbornylmethacrylate, norbornylmethyl methacrylate, isobornyl methacrylate, lauryl methacrylate 2-ethylhexyl methacrylate, 2-hydroxyethyl methacrylate, hydroxypropyl acrylate, hexanediol acrylate, 2-phenoxyethyl acrylate, 2-hydroxyethyl acrylate, 2-hydroxypropyl acrylate, diethyleneglycol acrylate, hexanediol methacrylate, 2-phenoxyethyl methacrylate, 2-hydroxyethyl methacrylate, 2-hydoxypropyl methacrylate, diethyleneglycol methacrylate, ethylene glycol dimethacrylate, ethylene glycol diacrylate, propylene glycol dimethacrylate, propylene glycol diacrylate, allyl methacrylate, allyl acrylate, butanediol diacrylate, butanediol dimethacrylate, 1,6hexanediol diacrylate, 1,6-hexanediol dimethacrylate, diethyleneglycol diacrylate, trimethylpropane triacrylate, pentaeryritol tetraacrylate, hexanediol dimethacrylate, diethyleneglycol dimethacrylate, trimethylolpropane triacrylate, trimethylpropane trimethacrylate, pentaeryritol tetramethacrylate, and combinations comprising at least one of the foregoing acrylates.

Additionally, the curable composition can comprise a polymerization initiator to promote polymerization of the curable components. Suitable polymerization initiators include photoinitiators that promote polymerization of the components upon exposure to ultraviolet radiation. Suitable photoinitiators include, but are not limited to benzophenone and other acetophenones, benzil, benzaldehyde and O-chlorobenzaldehyde, xanthone, thioxanthone, 2-chlorothioxanthone, 9,10-phenanthrenenquinone, 9,10-anthraquinone, methylbenzoin ether, ethylbenzoin ether, isopropyl benzoin ether, 1-hydroxycyclohexyphenyl ketone, α,α-diethoxyacetophenone, α,α-dimethoxyacetoophenone, 1-phenyl-,1,2-propanediol-2-o-benzoyl oxime, 2,4,6-trimethylbenzoyldiphenyl phosphine oxide, and, α,α-dimethoxy-α-phenylacetopheone, as well as combinations comprising at least one of the foregoing.

The coating material (e.g., the curable composition) disposed on the first surface (e.g., 116) of the base film (e.g., 114) can comprise a thickness sufficient to minimize/eliminate the appearance of ripples in the film. It is briefly noted that ripple appearance not only can be influenced by extrusion processing conditions, but can also vary depending on the thickness of extruded base films. Under a similar extrusion processing window, a thicker gauge of film can display a worse ripple appearance compared to a thinner gauge of film. Without being bound by theory, the thicker gauge of film would employ a thicker coating compared to the thinner gauge film in order to provide a similar effect of reducing/eliminating ripples as the thinner coating on the thinner gauge of films. For example, the coating material can comprise a thickness greater than or equal to about 2 micrometers, more particularly about 2 micrometers to about 18 micrometers.

In an embodiment, a coated film comprises a base film having a first side coated with a coating material and an uncoated second side, wherein the base film was formed in a calendaring process, and wherein, during the calendaring process, the first side physically contacted less surface area of a first roll than a second side physically contacted of a second roll at a given time. In other words, the first side was in physical contact with the first roller for a shorter period of time compared to the time that the second surface was in physical contact with the second roll.

Additionally, it is to be understood that the coated films disclosed herein can further be processed depending on the desired application. For example, multiple coated films can be laminated together to form a laminated film, additional coating layers can be added to the coated side of the coated film, and the like. Moreover, while it is noted that the coated films disclosed herein can be particularly useful as optical films, it is to be understood that any film comprising a first coated side and a second uncoated side, wherein the first and second side are those defined above, are envisioned to be within the scope of this disclosure.

EXAMPLE

In this example, the appearance of ripple in a film was studied. Since there is no standard procedure (e.g., an American Society for Testing and Materials (ASTM) procedure) on measuring ripple in a film, the following ripple standard was devised and employed in comparing the appearance of ripple in a film.

The ripple rating standard comprised a rating scale from 5 to 10, wherein a rating of 5 indicated the least amount of ripples and a rating of 10 indicated the greatest amount of ripples. FIGS. 4-9 showed each rating number employed in rating each sample. If the ripple appearance fell between two rating numbers, the sample was given a rating number of the numerical average of the two rating numbers (e.g., if the sample fell between 5 and 6, the rating was a 5.5). It is noted that ripples in a film were observed as a contrast between "dark" and "light" areas on the film. In other words, as the contrast between dark and light areas increased the ripple rating increased. Moreover, it is noted that a ruler was provided in each figure merely to indicate the scale of the figure.

Film samples were cut in to two samples, each having dimensions of 12 inches (about 20 centimeters) by 24 inches (about 61 centimeters). The central portion of the film sample was disregarded. A human operator standing about 4 feet from a projection surface (e.g., a wall, projection screen, and the like) held each sample in each hand. A shadow graph (Kni-tron rectifier, commercially available from Kneisley Electric Company, Toledo Ohio) was turned on. Each sample reflected a shadow on the projection surface. The sample having the edge with the worse ripple appearance was selected and compared to the standard samples. More particularly, the worse edge of the sample (i.e., edge having most ripples) was aligned with worse edge of standard samples. The sample was rated.

In theses example, a polycarbonate base film comprising greater than 99 wt. % polycarbonate, wherein the weight percent was based on a total weight of the base film, and having a thickness of 25 mils (635 micrometers) was extruded by the above described method. The base film without any coating material had a ripple rating of 8.

Samples were prepared with a coating composition comprising 40.00 wt. % hexanediol diacrylate (HDODA), 40.00 wt. % trimethoyl propane triacrylate (TMPTA), 11.30 wt. % dipentaerythrirol pentacrylate (DPEPA), 2.10 wt. % diethoxy acetopenone (DEAP), and 6.60 wt. % cellulose acetate butrate (CAB) by the coating method described above. More particularly, the samples were coated by the coating method described in U.S. Pat. No. 5,455,105 to Coyle et al. and U.S. Pat. No. 5,271,968 to Coyle et al. The thickness of the coating material was about 2 micrometers to 4 micrometers.

A coated base film coated on the second side of the base film had a ripple rating of 7. A coated base film coated on the first side of the base film unexpectedly had a ripple rating of 5. Additionally, a dual coated polycarbonate base film (i.e., a base film that was coated on both the first side and the second side) having a thickness of 25 mils (635 micrometers), commercially available from Tekra Corporation was tested and had a ripple rating of about 5.

In other words, a film coated on the first side of the base film had a significant improvement compared to both an uncoated base film and a coated film that was coated on the second side. Furthermore, it was unexpectedly discovered that a base film that was coated on the first side (as defined above) had a reduction in ripple appearance comparable to a base film that was coated on both the first side and the second side, while employing less material. It is noted that base films coated on the first side can have a ripple rating less than 6, more particularly a ripple rating of 5.

It should be noted that coated films have traditionally been coated on the second side of the base film, i.e., the side of the base film that physically contacts a second roll, wherein the second roll was the roll having the greatest surface area in physical contact with a film a given time compared to a first roll. Unlike traditional coating methods, the method disclosed herein coats on the first side of the base film, i.e., the side of the base film that physically contacts a first roll, wherein the first roll was the roll having the least surface area in physical contact with the film at a given time compared to the second roll.

Furthermore, traditional methods to reduce the ripple appearance in the film have generally been focused on monitoring and controlling the extrusion processing conditions that have been attributed to causing ripples (e.g., differences in the nip force between the rolls, differences in the film flow rates at the nip rolls and the pull roll, differences in roll speeds, and the like). However, it is noted that these methods do not address other sources of ripple formation such as flow instability during the extrusion process. Moreover, it is noted that these systems can have increased control systems compared to the system disclosed herein. In other words, the system and method disclosed herein advantageously reduces/eliminates the appearance of ripples in a film without adding complex control systems to methods of extruding and coating a base film.

Additionally, the system and method clearly offers advantages over coating on both the first and the second side of the base film. More particularly, material and manufacturing cost of the coating film can be reduced, the overall thickness of the film can be reduced, and the like, compared to films coated on the first and the second side of the base film. Since one use of the coated film is for optical devices and articles, it is noted that the coated film disclosed herein can advantageously decrease the overall thickness of the film compared to films coated on both the first and the second side of the base film, thereby meeting consumer demands for thinner films with increased performance. Furthermore, the system and method disclosed herein can also reduce/eliminate the appearance of ripples in a film that is caused by other causes such as flow instability during extrusion process that cannot be improved via the complex electrical-mechanical control systems in the traditional methods.

While the invention has been described with reference to several embodiments thereof, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A method of making a coated film, comprising:
    coating a first side of a base film with a coating material to form the coated film;
    wherein the base film was formed in a calendaring process, and wherein, during the calendaring process, resin used to form the base film physically contacted less surface area of a first metal roll than the resin physically contacted of a second metal roll; and
    wherein the coated film has an uncoated second side.

2. The method of claim 1, wherein a thickness of the coating material is greater than about 2 micrometers to about 18 micrometers.

3. The method of claim 1, wherein the coating material comprises a UV curable material.

4. The method of claim 3, further comprising curing the coating material by passing UV radiant energy through the second side of the base film to the first side of the base film.

5. The method of claim 1, wherein the base film comprises 50 wt. % to about 100 wt. % polycarbonate, and wherein weight percents are based on a total weight of the base film and wherein the coating material comprises an acrylate.

6. The method of claim 1, wherein the first side and the second side of the base film comprise a polished surface.

7. The method of claim 1, wherein the coated film had a ripple rating of less than 6.

8. The method of claim 1, wherein the first metal roll and/or the second metal roll comprise a material selected from the group consisting of chrome, stainless steel, and aluminum.

9. A method of making a coated film, comprising:
    coating a first side of a base film with a coating material to form the coated film;
    wherein the base film was formed in a calendaring process, and wherein, during the calendaring process:
    a resin was extruded onto a first metal roll and a second metal roll;
    the resin passed between the first metal roll and the second metal roll to form the base film;
    wherein the first metal roll had a lesser surface area in physical contact with the resin than the second metal roll; and
    wherein the first side physically contacted the first metal roll; and
    wherein the coated film has an uncoated second side.

10. The method of claim 9, wherein a thickness of the coating material is greater than about 2 micrometers to about 18 micrometers.

11. The method of claim 9, wherein the coating material comprises a UV curable material.

12. The method of claim 11, further comprising curing the coating material by passing UV radiant energy through the second side of the base film to the first side of the base film.

13. The method of claim 9, wherein the base film comprises 50 wt. % to about 100 wt. % polycarbonate, and wherein weight percents are based on a total weight of the base film and wherein the coating material comprises an acrylate.

14. The method of claim 9, wherein the coated film had a ripple rating of less than 6.

15. The method of claim 9, wherein the first metal roll and/or the second metal roll comprise a material selected from the group consisting of chrome, stainless steel, and aluminum.

* * * * *